United States Patent
Lengyel

(10) Patent No.: US 10,373,352 B1
(45) Date of Patent: Aug. 6, 2019

(54) METHOD FOR RENDERING RESOLUTION-INDEPENDENT SHAPES DIRECTLY FROM OUTLINE CONTROL POINTS

(71) Applicant: Eric Lengyel, Lincoln, CA (US)

(72) Inventor: Eric Lengyel, Lincoln, CA (US)

(73) Assignee: Terathon Software LLC, Lincoln, CA (US)

( * ) Notice: Subject to any disclaimer, the term of this patent is extended or adjusted under 35 U.S.C. 154(b) by 0 days.

(21) Appl. No.: 15/885,820

(22) Filed: Feb. 1, 2018

(51) Int. Cl.
  *G06T 11/20* (2006.01)
  *G06K 9/46* (2006.01)
(52) U.S. Cl.
  CPC .......... *G06T 11/203* (2013.01); *G06K 9/4604* (2013.01); *G06T 2200/28* (2013.01); *G06T 2210/21* (2013.01)
(58) Field of Classification Search
  CPC .......... G09G 5/346; G09G 2340/0464; G09G 2360/18; G06T 3/20; G06T 2200/28; G06T 11/203; G06T 2210/21; G06K 9/4604
  USPC ........................................................ 345/442
  See application file for complete search history.

(56) References Cited

U.S. PATENT DOCUMENTS

| 7,564,459 | B2 | 7/2009 | Loop | |
| 2007/0097123 | A1* | 5/2007 | Loop | G06T 11/203 345/442 |
| 2009/0070075 | A1* | 3/2009 | Funk | G06T 1/0028 703/1 |

OTHER PUBLICATIONS

Green, "Improved Alpha-Tested Magnification for Vector Textures and Special Effects", ACM SIGGRAPH 2007 Courses, United States, pp. 9-18.
Loop and Blinn, "Resolution Independent Curve Rendering Using Programmable Graphics Hardware", Proceedings of ACM SIGGRAPH 2005, United States, pp. 1000-1009.
Wallace, "Easy Scalable Text Rendering on the GPU", 2016. https://medium.com/@evanwallace/easy-scalable-text-rendering-on-the-gpu-c3f4d782c5ac.
Dobbie, "GPU text rendering with vector textures", 2016. http://wdobbie.com/post/gpu-text-rendering-with-vector-textures/.

* cited by examiner

*Primary Examiner* — Ke Xiao
*Assistant Examiner* — Kim Thanh T Tran

(57) ABSTRACT

A method for rendering a shape partially defined by quadratic Bézier curves computes the winding number with respect to one or more closed contours to determine whether a sample position is colored. Numerical robustness is achieved by classifying the controls points of each Bézier curve in order to partition the set of all possible Bézier curves into eight equivalence classes that can each be processed in the same manner. A small table of binary values specifies whether the roots of a classified Bézier curve are eligible to modify the winding number at a particular pixel location.

9 Claims, 9 Drawing Sheets

METHOD FOR RENDERING RESOLUTION-INDEPENDENT SHAPES DIRECTLY FROM OUTLINE CONTROL POINTS

CROSS-REFERENCE TO RELATED APPLICATION

This application claims priority from provisional application No. 62/476,873, filed Mar. 27, 2017, the disclosure of which is incorporated herein by reference for all purposes.

BACKGROUND OF THE INVENTION

1. Field of the Invention

The present invention relates to the field of 3D computer graphics and more specifically to the rendering of shapes defined by quadratic Bézier curves.

2. Description of Related Art

With the use of modern digital fonts, text is composed of a series of individual glyphs that determine the shape of each letter, number, or symbol. The outline of each glyph is defined by a set of Bézier curves, having either quadratic or cubic degree, connected to each other in such a way that they form one or more closed contours. Real-time rendering applications often have a need to display text inside a 3D scene, and any particular string of text can be applied to a geometric surface, or it can be shown as a free-floating label. Because the camera position from which scenes are rendered is almost always moving through space or rotating in some way, the glyphs that compose text in the scene are drawn with continuously changing transforms. Thus, the size of the glyphs in the viewport are almost never the same from one frame to the next. Furthermore, the glyphs are often drawn with perspective distortion because the camera isn't necessarily pointed straight at the surface to which text is applied. These conditions create a demand for the ability to dynamically render glyphs with high quality under arbitrary affine and projective transforms.

The simplest method for rendering text in a 3D environment involves rasterizing the glyphs belonging to a font at one or more specific sizes and storing the results in a pixel image known as a texture atlas. Text is rendered in a 3D scene by drawing one quad, usually comprising two triangles, per glyph and assigning texture coordinates that map a prerendered glyph in the texture atlas to the area covered by the quad. This method has been popular due to its ease of implementation and its excellent performance, but the output quality is extremely limited primarily due to blurring caused by bilinear interpolation when the displayed sizes of the glyphs exceed the resolution at which they are stored in the texture atlas.

A more advanced method calculates a signed distance field (SDF) for each glyph, as described in "Improved Alpha-Tested Magnification for Vector Textures and Special Effects", C. Green, SIGGRAPH 2007 Courses, pp. 9-18. This technique is able to produce crisp glyph outlines at widely varying scales by storing per-pixel distances to the glyph boundaries in the texture atlas instead of storing the final appearance of each glyph at a specific size. However, this method rounds off sharp corners and thus does not preserve the true outlines of the glyphs, a problem addressed in an enhancement of the method that calculates multiple channels of distance data for each glyph. Single-channel SDFs and, to a much larger degree, multiple-channel SDFs require a complicated analysis step in the preparation of the texture atlas, and due to their resolution dependence, are often unable to properly capture fine details in complex glyphs.

Resolution-independent methods aim to draw glyphs at any scale without the artifacts associated with image data or signed distance field data stored in a prerendered texture atlas. These methods work by rendering glyphs directly from the mathematical curves that define their shapes, avoiding an intrinsic resolution dependence because the exact positions of each outline's control points are utilized throughout the rendering process without any prior per-pixel sampling.

One method, described in "Resolution Independent Curve Rendering Using Programmable Graphics Hardware", C. Loop and J. Blinn, Proceedings of ACM SIGGRAPH 2005, pp. 1000-1009, renders a glyph by constructing a triangle mesh that incorporates its outline control points as vertex positions. Each triangle corresponds to at most one Bézier curve, and a short calculation in a pixel shader determines whether each pixel covered by the triangle is inside or outside the boundary with respect to that one curve. This method effectively renders precise glyph shapes at all scales, but it requires a complicated triangulation step in which the number of vertices is proportional to the number of control points defining each glyph, a significant divergence from the constant four vertices required per glyph for the previously described methods. The variable and font-dependent numbers of vertices per glyph make it more difficult to perform text layout in general, especially if the text needs to be clipped or applied to a curved surface. Furthermore, this method tends to require small, thin triangles that prevent optimal performance on the graphics processing unit (GPU).

A different method renders a glyph by using only two triangles to cover a glyph's bounding box, and a program, typically a pixel shader executed on the GPU, accesses a subset of all the Bézier curves defining the glyph's outline to determine whether each pixel location is inside or outside the entire boundary of the shape. This method requires a way of dynamically calculating either a signed distance value or a winding number at each pixel location, but in the process of computing this information, it is difficult to avoid numerical precision problems involving floating-point round-off errors that produce a variety of rendering artifacts. These artifacts often appear upon modest magnification and manifest themselves as isolated pixels and linear clusters of pixels that are incorrectly drawn due to round-off errors causing the misclassification of pixel locations with respect to a glyph's outline.

BRIEF SUMMARY OF THE INVENTION

The present invention renders filled shapes having outlines defined by one or more closed contours composed of quadratic Bézier curves by calculating the winding number for each pixel inside a rectangular boundary enclosing the entire shape. The winding number is calculated by considering rays that begin at the pixel location and extend to infinity in directions parallel to the x and y axes. Each intersection of such a ray with a clockwise-wound contour increments the winding number, and each intersection of such a ray with a counterclockwise-wound contour decrements the winding number.

In the various embodiments of the present invention, numerical robustness is guaranteed by classifying the control points of each Bézier curve with respect to each ray in order to reduce the problem space to a set of eight possible states. The number and types of ray intersection are predetermined for each state, and the manner of processing cases belonging to each possible state is dictated by a small table of constant data. This technique avoids all visible artifacts associated with floating-point round-off errors.

It is to be noted that the appended drawings illustrate only typical embodiments of this invention and are therefore not to be considered limiting of its scope, for the invention may admit to other equally effective embodiments.

DETAILED DESCRIPTION OF THE INVENTION

Figure 1:
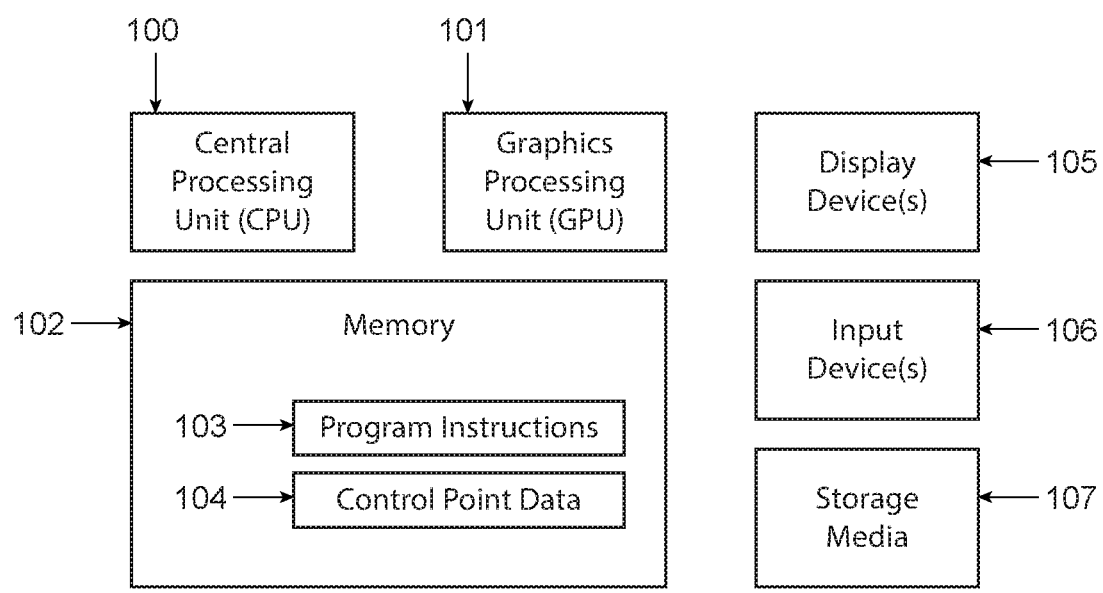
FIG. 1 is a block diagram showing an example of a typical computer system on which an embodiment of the invention may be implemented.

The present invention renders shapes having outlines that are defined by a set of quadratic Bézier curves forming one or more closed contours. Such shapes may correspond to glyphs belonging to a font, but the invention applies more generally to shapes similarly defined for other purposes. Referring to FIG. 1, a typical embodiment runs on a computer system having a CPU 100 and a memory 102 where program instructions 103 implementing the method of the present invention are stored. The computer system may include a GPU 101, and the program instructions may be executed on either the CPU or the GPU, if present. The highly parallel nature of the method, specifically that program instructions may be executed independently for each member of an array of pixels covering a shape, makes GPU execution the preferred embodiment. The computer system may also include one or more display devices 105, one or more input devices 106, storage media 107, or additional components not shown. For each execution of the program instructions, the inputs consist of a pixel location and the control point data 104 corresponding to the set of quadratic Bézier curves defining the outline of the shape being rendered. In a basic embodiment of the invention, the output is a Boolean value indicating whether the pixel location lies within the interior of the shape or not. In a more sophisticated embodiment, the output is a fractional numerical value approximating the portion of the pixel that is covered by the interior of the shape.

Figure 2:
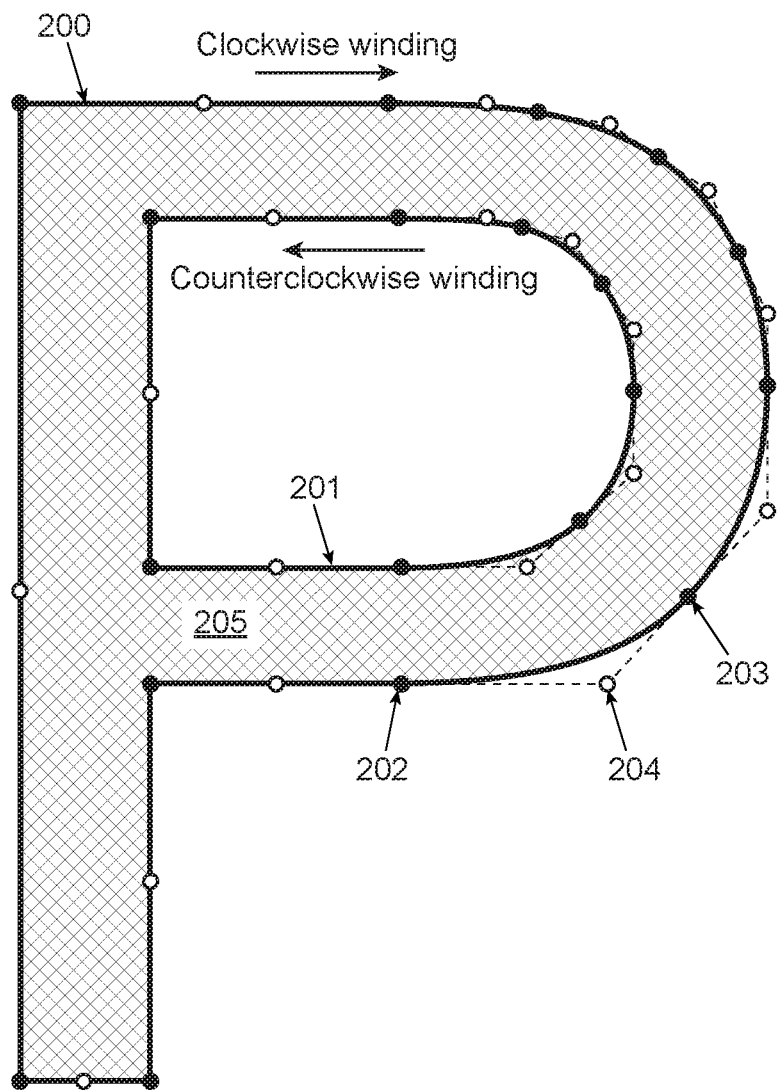
FIG. 2 is an example of a shape having an outline defined by a set of closed contours composed of quadratic Bézier curves.

FIG. 2 illustrates one example of a shape corresponding to the capital letter "P" in the Arial font. The shape is defined by a set of closed contours that are each composed of a continuous piecewise sequence of quadratic Bézier curves. In this example, the shape is defined by two contours 200 and 201, and they are wound in opposite directions. Each Bézier curve comprises two on-curve control points shown as filled circles, such as points 202 and 203, and one off-curve control point shown as an open circle, such as point 204, between the two on-curve control points. A particular pixel location is considered to be in the interior 205 of the shape outline if the total winding number, equal to the sum of the winding numbers specific to each of the shape's contours, is nonzero. The winding number specific to each contour is an integer that reflects the number of complete loops the contour makes around a point. A positive number is assigned to one winding direction, clockwise or counterclockwise, and a negative number is assigned to the opposite winding direction.

Figure 3:
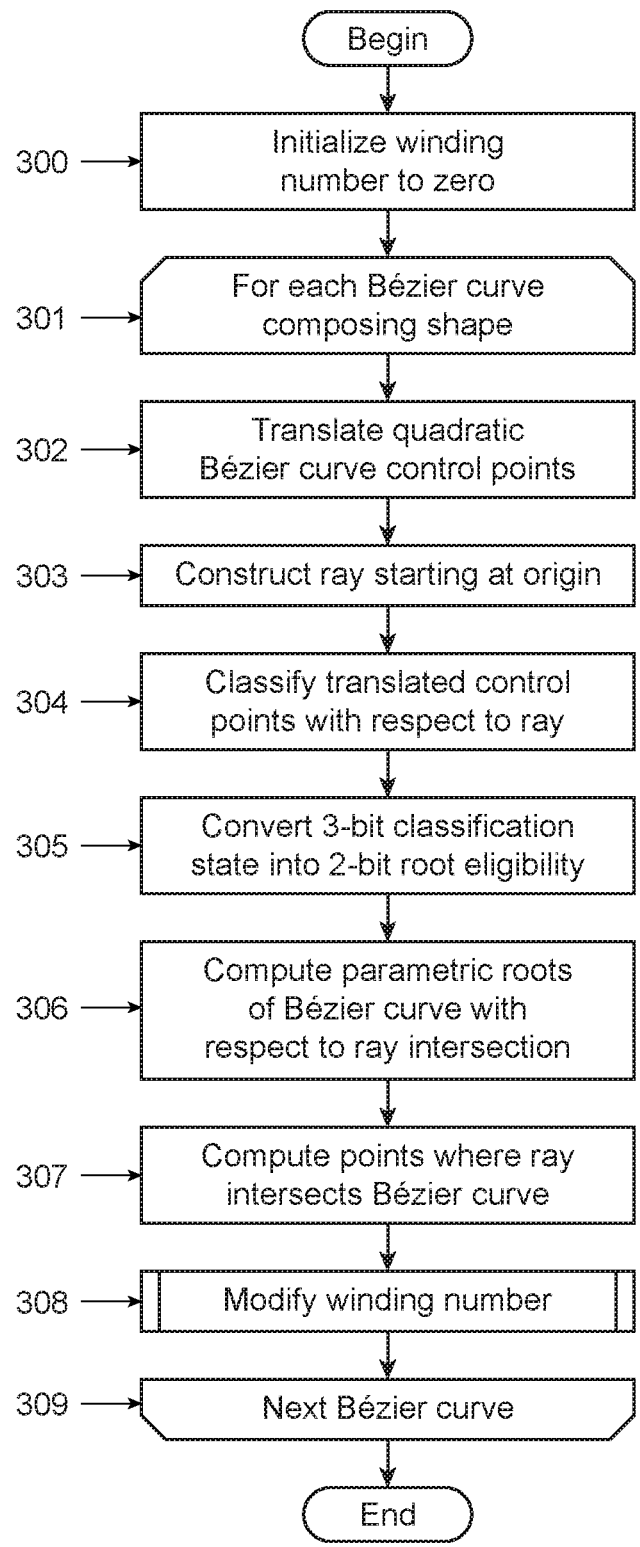
FIG. 3 is a flowchart illustrating an example of the major steps of the total winding number computation for a particular pixel location.

The total winding number for a particular pixel location is typically calculated through the process shown in FIG. 3, which illustrates one possible implementation of the present invention. The total winding number is initialized to zero at block 300. Between blocks 301 and 309, the implementation considers each of the quadratic Bézier curves composing the complete shape. The control points of a particular Bézier curve are translated in block 302 such that the pixel location coincides with the origin of the coordinate system. In block 303, a ray is constructed beginning at this origin and extending to infinity in an arbitrary direction. The goal is to accurately discover all of the intersections the ray makes with the set of Bézier curves defining the shape. In a particular embodiment, it is convenient to choose ray directions that are parallel to the coordinate axes, and the description below uses a ray parallel to the x axis as an example. It should be noted that the same description applies to rays aligned to other directions and that the mathematical formulae are equally valid after an appropriate coordinate rotation. When a contour crosses the ray from left to right, one is added to the total winding number, and when a contour crosses the ray from right to left, one is subtracted from the total winding number. The choice as to whether one is added or subtracted for a particular crossing direction may be reversed as long as the choice is applied consistently. If, after considering the complete set of contours, the total winding number is nonzero, then the pixel location lies within the interior of the shape's outline. Otherwise, in the case that the total winding number is zero, the pixel location lies in the exterior.

A single component of a contour is defined by the parametric function $$C(t)=(1-t)^2 p_1 + 2t(1-t)p_2 + t^2 p_3, \qquad (1)$$

which constitutes a quadratic Bézier curve having the 2D control points $p_1$, $p_2$, and $p_3$. The parameter t varies over the range $[0, 1]$. For a ray pointing in the direction of the positive x axis in a coordinate system in which the location of the pixel being rendered has been translated to the origin, the values of t at which $C_y(t)=0$ are determined by finding the roots of the polynomial $$(y_1 - 2y_2 + y_3)t^2 - 2(y_1 - y_2)t + y_1, \qquad (2)$$

where $p_i = (x_i, y_i)$. The parametric roots $t_1$ and $t_2$ are then given by $$t_1 = \frac{b - \sqrt{b^2 - ac}}{a} \text{ and } t_2 = \frac{b + \sqrt{b^2 - ac}}{a}, \qquad (3)$$

where $a = y_1 - 2y_2 + y_3$, $b = y_1 - y_2$, and $c = y_1$. In the case that a is near zero, we instead compute $c/2b$ and assign it to both roots $t_1$ and $t_2$. As shown in FIG. 3, the values of $t_1$ and $t_2$ are calculated in block 306, and the points $C(t_1)$ and $C(t_2)$ are calculated in block 307. From a purely mathematical perspective, any values of $t_1$ in the range $[0, 1)$ such that $C_x$ ($t_i$)>0 correspond to a valid intersection between the ray and the Bézier curve. However, this calculation is prone to numerical precision errors whenever $y_1$ or $y_3$ is very small in absolute value. The problem is that the finite number of bits in a floating-point value are incapable of producing the exactness needed in calculating $t_1$ and $t_2$ where either could be close to zero or one. The result is that a ray passing too close to the point where two Bézier curves are connected may unintentionally cause two intersections to be counted or both curves to be missed altogether, leading to the appearance of rendering artifacts. The errors are especially problematic in cases where the Bézier curve is tangent to the ray at its first or last control point.

The present invention achieves unconditional numerical robustness over the entire space of finite inputs by ignoring the values of $t_i$ insomuch as whether they satisfy $t_i \in [0, 1)$ and instead calculating winding numbers based solely on a binary classification of the values $y_1$, $y_2$, and $y_3$, specifically whether each is negative or not negative. This classification is preferred over the equally valid classification based on whether the values are positive or not positive because it is convenient in practice to extract sign bits from the standard IEEE 754 floating-point representations of the values. In FIG. 3, the classification is performed in block 304. Embodiments in which they coordinates are assigned a trinary classification derived from whether their values are positive, negative, or zero are also possible, but some of the resulting states would be redundant. For a binary classification, every quadratic Bézier curve has a three-bit state that reduces the problem domain to exactly eight distinct equivalence classes. A table lookup or logic calculation in block 305 converts the three-bit state into a two-bit code indicating whether each root is eligible to make a contribution to the winding number. For all of the cases belonging to each equivalence class, modifications to the winding number arising from contributions of the two roots at $t_1$ and $t_2$ are processed in exactly the same manner in block 308, having the implementation shown in FIG. 4.

Figure 4:
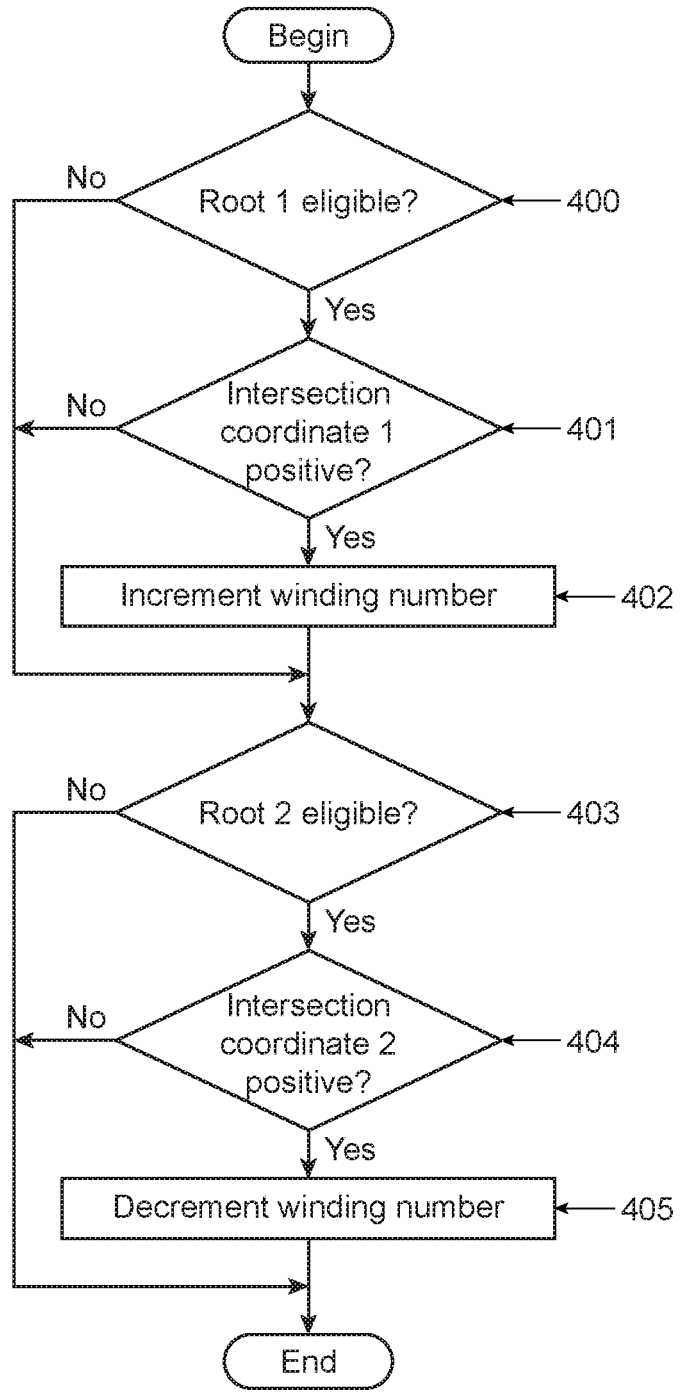
FIG. 4 is a flowchart illustrating an example of the major steps of the modification to the winding number performed for each Bézier curve.
Figure 5A:
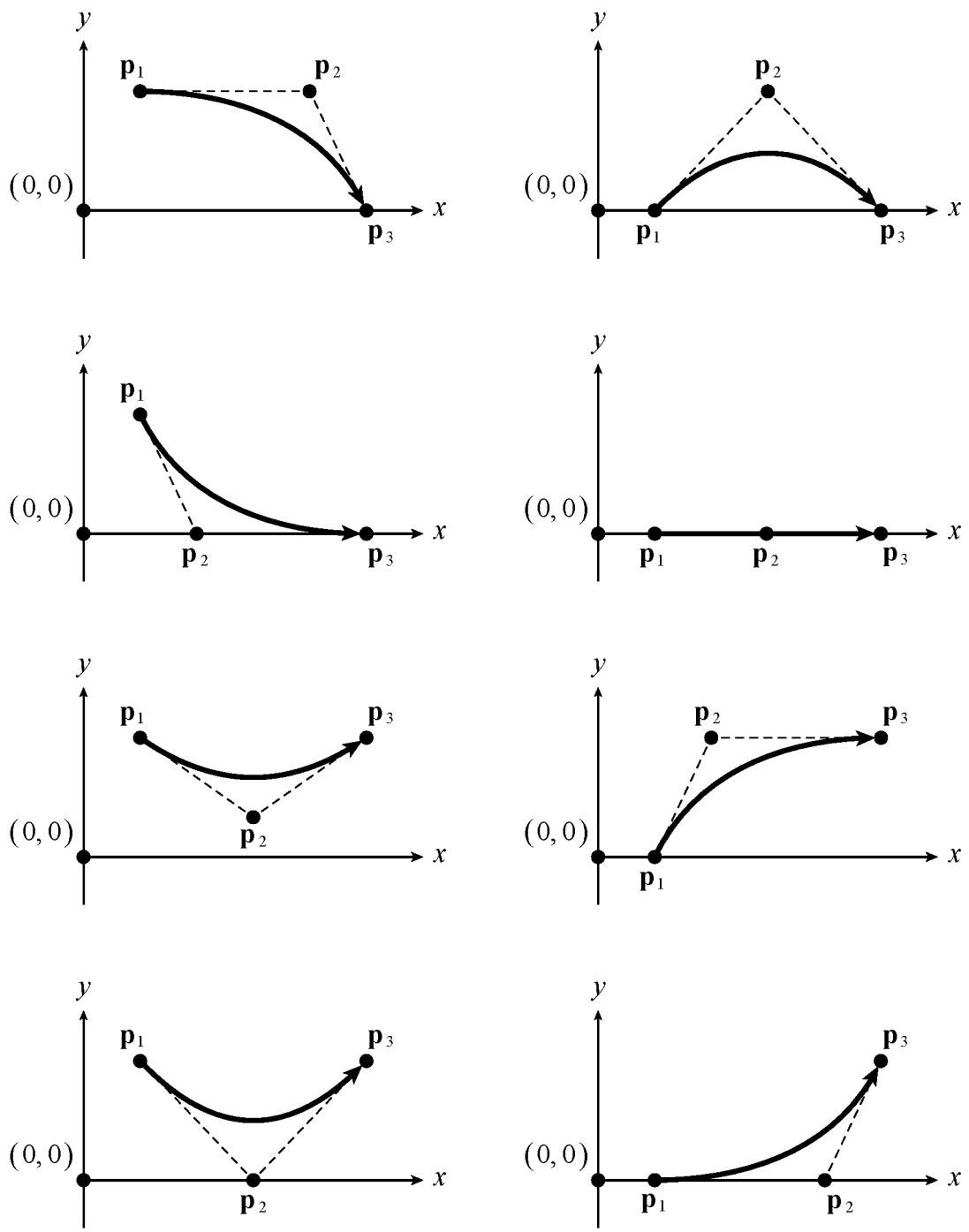
FIGS. 5A-5H are graphs illustrating example member curves of the eight equivalence classes into which all quadratic Bézier curves are classified with respect to a ray.
Figure 5B:
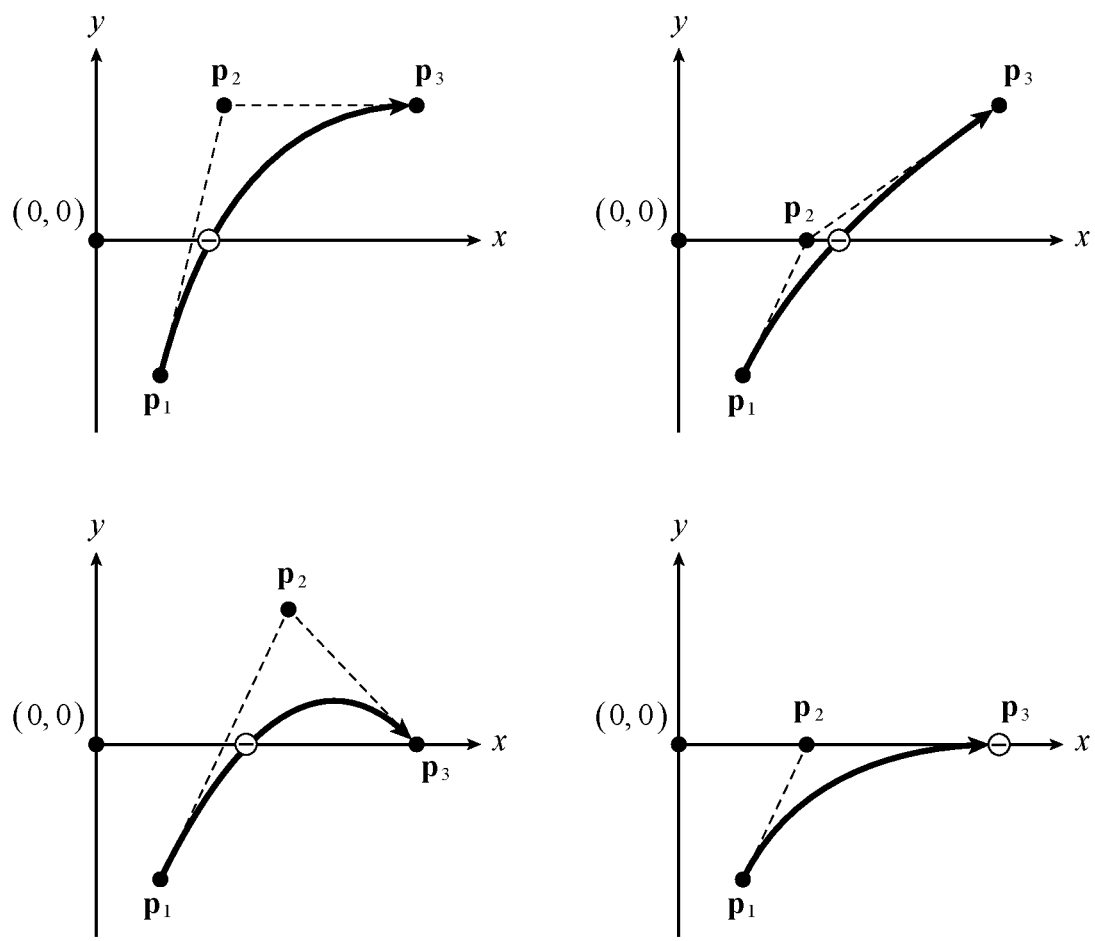
Figure 5C:
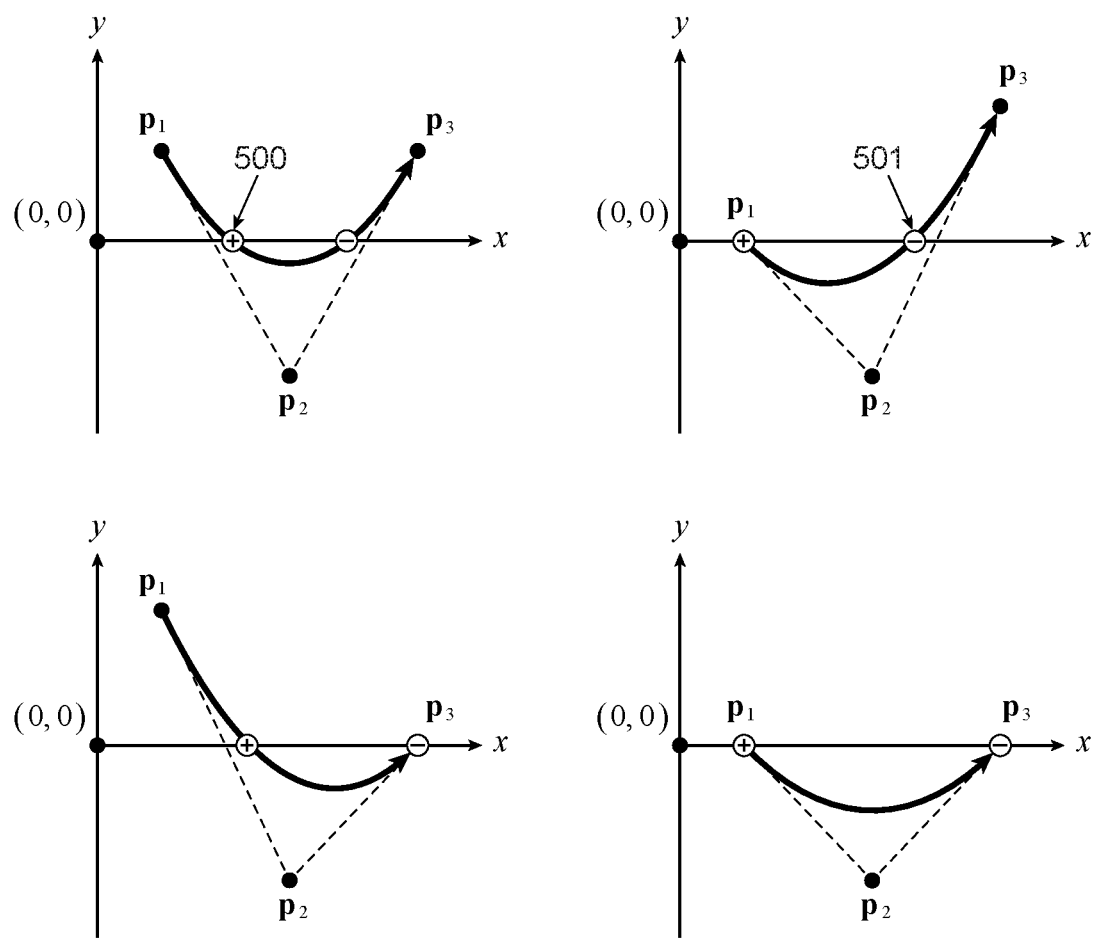
Figure 5D:
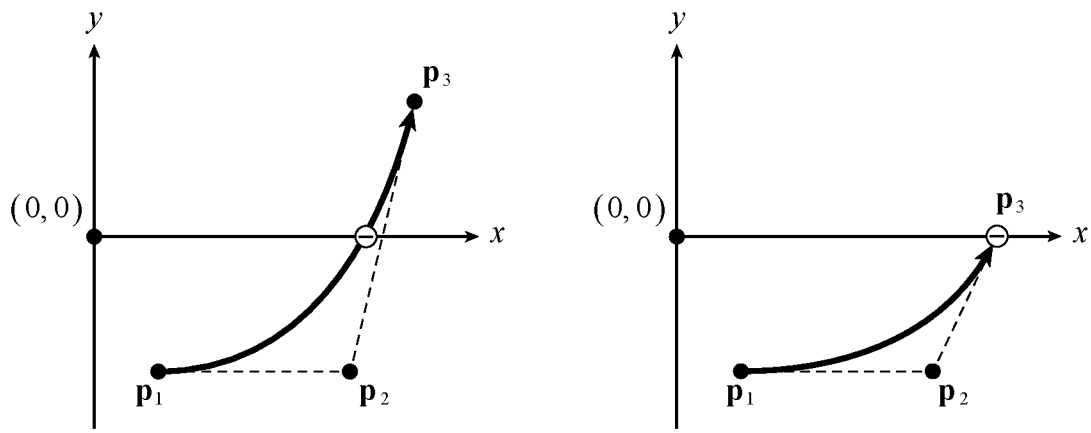
Figure 5E:
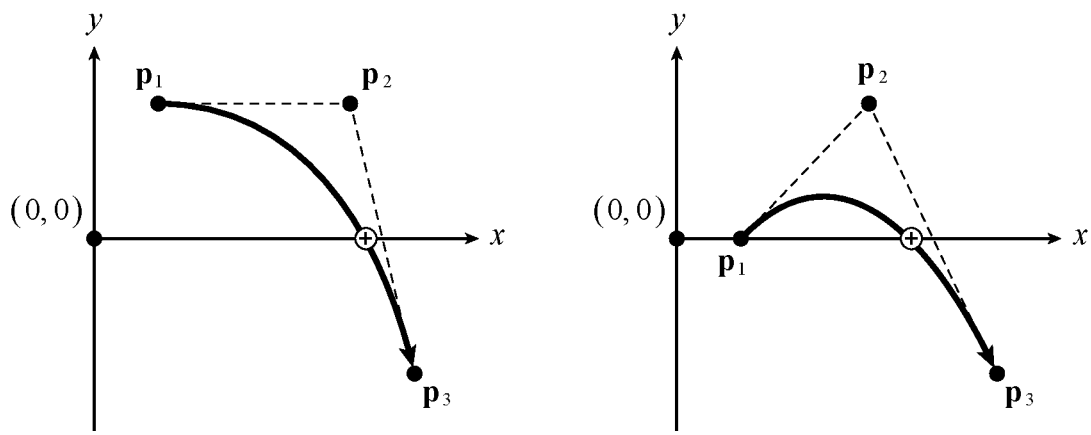
Figure 5E:
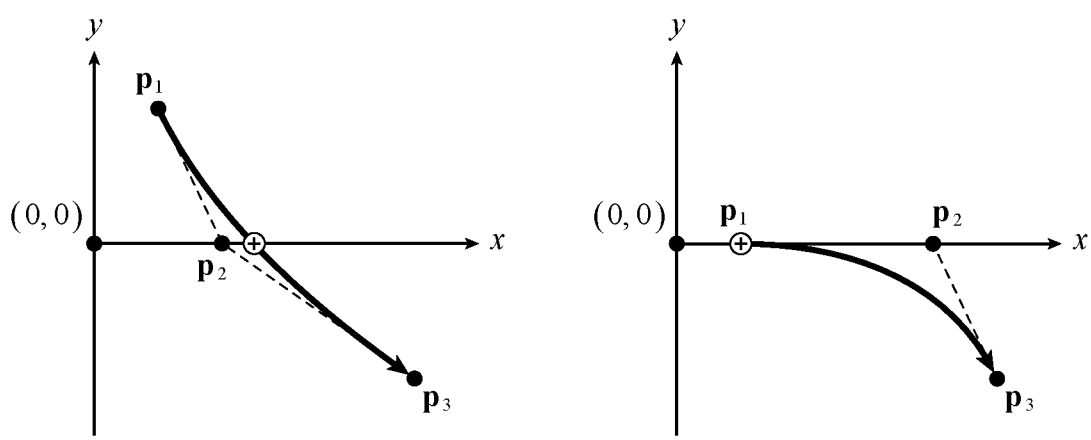
Figure 5F:
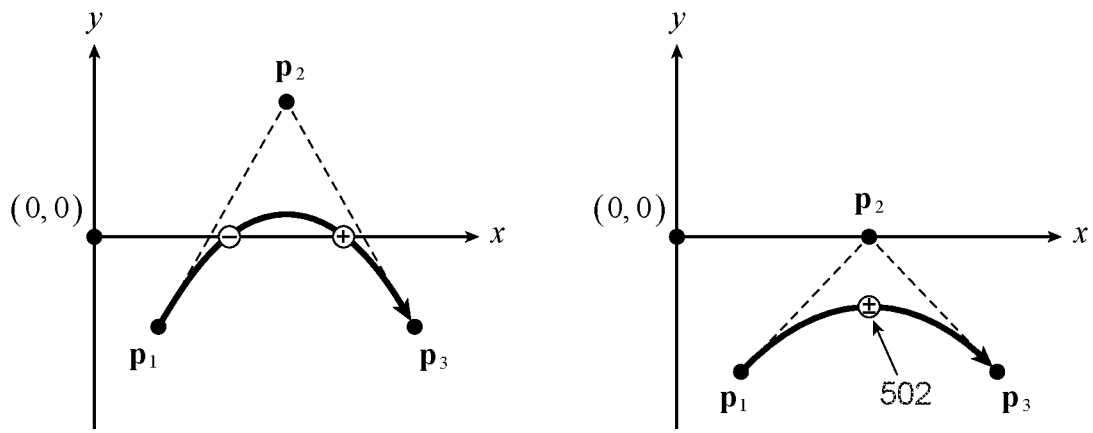
Figure 5G:
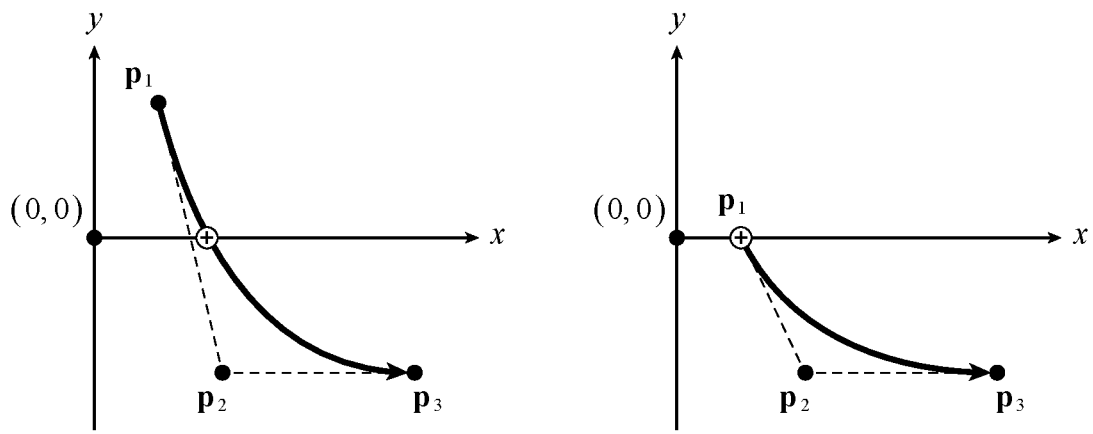
Figure 5H:
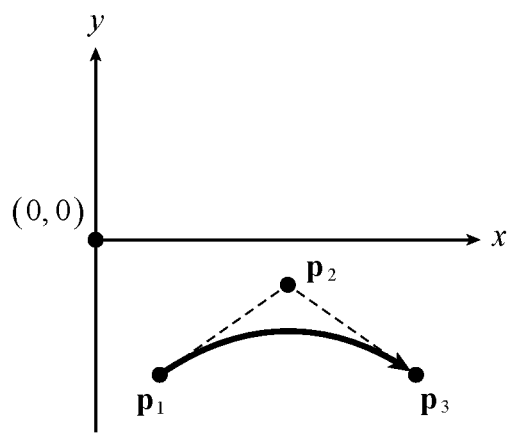

The derivative of equation (2) is given by 2at−2b, and substituting $t_1$ for t always results in a negative number or zero. Referring to FIG. 4, whenever the root at $t_1$ is determined eligible in block 400 and the condition $C_x(t_1)$>0 is satisfied in block 401, the winding number is incremented by one in block 402 because the curve must cross the ray from left to right. Similarly, substituting $t_2$ for t in the derivative always results in a positive number or zero, so whenever the root at $t_2$ is determined eligible in block 403 and the condition $C_x(t_2)$>0 is satisfied in block 404, the winding number is decremented by one in block 405 because the curve must cross the ray from right to left. (As mentioned above, the reverse convention, interchanging the increment and decrement operations, is also valid as long as it is applied consistently.) The ordering of the values $C_x(t_1)$ and $C_x(t_2)$ does not affect the potential contributions made by the roots at $t_1$ and $t_2$.

Table 1 below lists the eight possible three-bit states for a quadratic Bézier curve and the associated two-bit root eligibility codes. In each of the columns Y1, Y2, and Y3, an entry having the value 1 corresponds to the states $y_1<0$, $y_2<0$, and $y_3<0$, respectively, and an entry having the value 0 corresponds to the states $y_1 \geq 0$, $y_2 \geq 0$, and $y_3 \geq 0$, respectively. In each of the columns T1 and T2, an entry having the value 1 indicates that the root associated with the parameter values $t_1$ and $t_2$, respectively, is eligible to make a contribution to the winding number when the conditions $C_x(t_1)$>0 and $C_x(t_2)$>0 are satisfied, respectively, and an entry having the value 0 indicates that the root is not eligible to make a contribution.

TABLE 1

| Class | Y3 | Y2 | Y1 | T2 | T1 |
|---|---|---|---|---|---|
| A | 0 | 0 | 0 | 0 | 0 |
| B | 0 | 0 | 1 | 0 | 1 |
| C | 0 | 1 | 0 | 1 | 1 |
| D | 0 | 1 | 1 | 0 | 1 |
| E | 1 | 0 | 0 | 1 | 0 |
| F | 1 | 0 | 1 | 1 | 1 |
| G | 1 | 1 | 0 | 1 | 0 |
| H | 1 | 1 | 1 | 0 | 0 |

FIGS. 5A-5H illustrate example curves representative of the equivalence classes listed in rows A-H of Table 1, respectively. The representative curves include all 27 cases in which $y_i<0$, $y_i=0$, and $y_i>0$ to make it clear what happens in the important instances in which a ray passes directly through a control point. The winding number may be modified whenever the curve transitions from negative to not negative or vice-versa. A circle containing a plus symbol, such as circle 500 in FIG. 5C, corresponds to a change of positive one occurring when the curve transitions from not negative to negative at the root $t_1$. A circle containing a minus symbol, such as circle 501 in FIG. 5C, corresponds to a change of negative one occurring when the curve transitions from negative to not negative at the root $t_2$.

In the equivalence classes associated with rows A and H in Table 1, no transitions between negative and not negative ever occur, and thus no modification is made to the winding number. In each of the remaining six equivalence classes, the potential for a modification to the winding number exists. The difficult case in which a contour is tangent to the ray at an endpoint shared by two consecutive curves is handled without explicit detection or special code. Equivalence class A includes all cases for which a contour is tangent to the ray at an endpoint but is otherwise positive, ensuring that the winding number is unmodified. In the similar case that a contour is tangent to the ray at an endpoint but is otherwise negative, two equal and opposite modifications are always made to the winding number, and they cancel each other out exactly. This is exemplified by the many combinations of tangent curves shown in FIGS. 5A-5H in which a circle containing a plus symbol and a circle containing a minus symbol would coincide when the curves are connected to each other. (Note that there is no requirement that the curves have a continuous derivative at the endpoint where they are joined.) In equivalence classes C and F, there is a special case in which $y_1$ and $y_3$ have the same state but $y_2$ has the opposite state, and it is possible that $C_y(t)$ has no real roots. In order to handle this condition with uniformity, any negative values of $b^2-ac$ are replaced by zero, which has the effect of setting $t_1=t_2=b/a$. If one root makes a contribution, then the other root does as well in this case because $C_x(t_1)=C_x(t_2)$, so they cancel each other out. An example of such a combination of a positive and negative modification to the winding number is indicated by the circle 502 shown in FIG. 5F.

The values in columns T1 and T2 of Table 1 form a 16-bit lookup table that can be expressed as the hexadecimal number 2E74, where the first two digits are a concatenation of the bits in column T2, and the last two digits are a concatenation of the bits in column T1. For a particular equivalence class, the values in columns Y1, Y2, and Y3 form a shift code such that when the number 2E74 is logically shifted right by the shift code, the eligibility state for the root at $t_1$ appears in the least significant bit of the result, and the eligibility state for the root at $t_2$ appears in the ninth least significant bit of the result. The shift code is effectively an index used to look up data from the appropriate bit positions in the table expressed as the number 2E74. For control point coordinates $y_1$, $y_2$, and $y_3$ corresponding to an arbitrary quadratic Bézier curve that has been translated so that the pixel location coincides with the origin, the shift code is given by $$\left(\begin{cases} 0, & \text{if } y_1 \geq 0 \\ 1, & \text{if } y_1 < 0 \end{cases}\right) + \left(\begin{cases} 0, & \text{if } y_2 \geq 0 \\ 2, & \text{if } y_2 < 0 \end{cases}\right) + \left(\begin{cases} 0, & \text{if } y_3 \geq 0 \\ 4, & \text{if } y_3 < 0 \end{cases}\right). \quad (1)$$

After the shift code is used to logically shift right the number 2E74, if the least significant bit of the result is set and $C_x(t_1) > 0$, then one is added to the winding number. If the ninth least significant bit of the result is set and $C_x(t_2) > 0$, then one is subtracted from the winding number.

The 16-bit lookup table and shift code calculation may be replaced by an equivalent sequence of logic operations, and doing so may achieve higher performance in an embodiment that executes instructions on a processor featuring a ternary logic instruction. Suppose that the values of $y_1$, $y_2$, and $y_3$ are stored as 32-bit IEEE 754 floating-point numbers, and let $k_1$, $k_2$, and $k_3$ be 32-bit signed integers having the same underlying bit patterns as $y_1$, $y_2$, and $y_3$, respectively. The most significant bit of the value given by $(\sim k_2 \& (k_2 | k_3)) | (\sim k_2 \& k_3)$ is equal to the eligibility state for the root at $t_1$, and the most significant bit of the value given by $k_1 \& (\sim k_2 | \sim k_3) | (k_2 \& \sim k_3)$ is equal to the eligibility state for the root at $t_2$. (Here, the symbol $\sim$ means unary logical NOT, the symbol & means binary logical AND, and the symbol | means binary logical OR.) Because the most significant bit of a signed integer determines whether the value is negative, the results of the logic operations can be tested for a negative sign to determine whether each root is eligible to make a contribution to the winding number.

Due to the fact that precision-sensitive range tests for the values of $t_1$ and $t_2$ are not utilized, it is not possible to miscount the number of intersections that a ray makes with a contour. The shift codes or logic operations used to determine the values in columns T1 and T2 of Table 1 are produced by exact calculations based on the translated y coordinates of the input control points, which are invariant along any horizontal ray. The quadratic and linear terms of $C_x(t)$ are also invariant, leaving only the constant term equal to the translated x coordinate of the control point $p_1$ as the quantity that changes as the ray origin is moved left or right. This guarantees that there exists a value $x_0$ such that for all $x \leq x_0$, a particular contour intersection is counted, and for all $x > x_0$, the same intersection is not counted.

Instead of calculating an integral winding number that outputs only a binary inside or outside state for each pixel location with respect to a shape's outline, an embodiment may accumulate fractional coverage values by considering how close each ray intersection is to the location of the pixel being rendered. The fraction f of a pixel crossed by a ray from left to right before an intersection occurs is given by $$f = sat\left(mC_x(t_i) + \frac{1}{2}\right), \quad (5)$$

where m is the number of pixels in one unit of distance in the shape's coordinate system, and "sat" is the saturate function that clamps its input value to the range [0, 1]. Adding and subtracting these fractions from the total winding number for each eligible root has the effect of antialiasing in the direction of the rays. The fractional coverage value can be calculated for rays parallel to both the x and y axes and combined to produce a rendered image with antialiasing applied in all directions. While many methods of combining the coverage values could be employed, the simplest example is an average of two coverage values.

The set of quadratic Bézier curves considered for any particular pixel location may be reduced in size by partitioning the area containing a shape into several bands that are aligned parallel to the directions of the rays used for intersection testing. In a preprocessing step, a list of curves intersecting each band is determined and stored alongside the control point data defining the shape. The list of curves for each band excludes every curve having control points that all lie in the same exterior side of the band because these curves correspond to equivalence classes A and H in Table 1 for every pixel inside the band and thus cannot make a contribution to the total winding number for such pixel locations.

It is to be understood that the above described embodiments are merely illustrative of numerous and varied other embodiments which may constitute applications of the principles of the invention. Such other embodiments may be readily devised by those skilled in the art without departing from the spirit or scope of this invention, and it is our intent that they be deemed within the scope of our invention.

The invention claimed is:

1. A method performed by a computer system for rendering a shape defined at least in part by one or more closed contours composed at least in part of one or more quadratic curves by calculating an associated winding number at a plurality of fixed sample positions corresponding to pixel locations, the method comprising:
   identifying Bezier control points for each said quadratic curve;
   classifying each said Bezier control point based on its position with respect to at least one ray;
   selecting at least one root of each said quadratic curve with respect to said ray, wherein said selection is based on a result of said classification;
   computing at least one root of each said quadratic curve with respect to said ray;
   computing at least one intersection point on each said quadratic curve, where said intersection point is computed at a parameter value corresponding to said root; and
   choosing a color determined by a spatial relationship between said intersection point and at least one said sample position.

2. The method of claim 1, wherein said classification of said Bezier control point is binary such that each said Bezier control point may be classified as being in one of two distinct states.

3. The method of claim 1, wherein said classification of said Bezier control point is trinary such that each said Bezier control point may be classified as being in one of three distinct states.

4. The method of claim 1, wherein said selection of said root is accomplished by using a table of values indexed by said result of said classification.

5. The method of claim 1, wherein said selection of said root is accomplished by applying a plurality of logic operations to said result of said classification.

6. The method of claim 1, further comprising a step of calculating a fractional pixel coverage value.

7. One or more non-statutory computer-readable storage media containing program instructions describing a method for causing a computer to render a shape defined at least in part by one or more closed contours composed at least in part of one or more quadratic curves, comprising:
   computer program code for identifying Bezier control points for each said quadratic curve;
   computer program code for classifying each said Bezier control point based on its position with respect to at least one axis;
   computer program code for selecting at least one root of each said quadratic curve with respect to said axis, wherein said selection is based on a result of said classification;
   computer program code for computing at least one root of each said quadratic curve with respect to said axis;
   computer program code for computing at least one intersection point on each said quadratic curve, where said intersection point is computed at a parameter value corresponding to said root; and
   computer program code for choosing a color determined by a spatial relationship between said intersection point and at least one said sample position.

8. The non-statutory computer-readable storage media of claim 7, wherein the program instructions are executed by a central processing unit.

9. The non-statutory computer-readable storage media of claim 7, wherein the program instructions are executed by a graphics processing unit.

\* \* \* \* \*

UNITED STATES PATENT AND TRADEMARK OFFICE
CERTIFICATE OF CORRECTION

PATENT NO. : 10,373,352 B1
APPLICATION NO. : 15/885820
DATED : August 6, 2019
INVENTOR(S) : Eric Lengyel Page 1 of 1

It is certified that error appears in the above-identified patent and that said Letters Patent is hereby corrected as shown below:

In the Claims
In Claim 7, Line 1, the word "non-statutory" should be replaced with --non-transitory--.
In Claim 8, Line 1, the word "non-statutory" should be replaced with --one or more non-transitory--.
In Claim 8, Line 2, the word "the" should be replaced with --said--.
In Claim 9, Line 1, the word "non-statutory" should be replaced with --one or more non-transitory--.
In Claim 9, Line 2, the word "the" should be replaced with --said--.

Signed and Sealed this
Twenty-eighth Day of April, 2020

Andrei Iancu
*Director of the United States Patent and Trademark Office*